June 30, 1959   D. E. MERWIN   2,892,448
ANIMAL-ACTUATED LIQUID APPLICATOR FOR LIVESTOCK
Filed Jan. 31, 1958   2 Sheets-Sheet 1
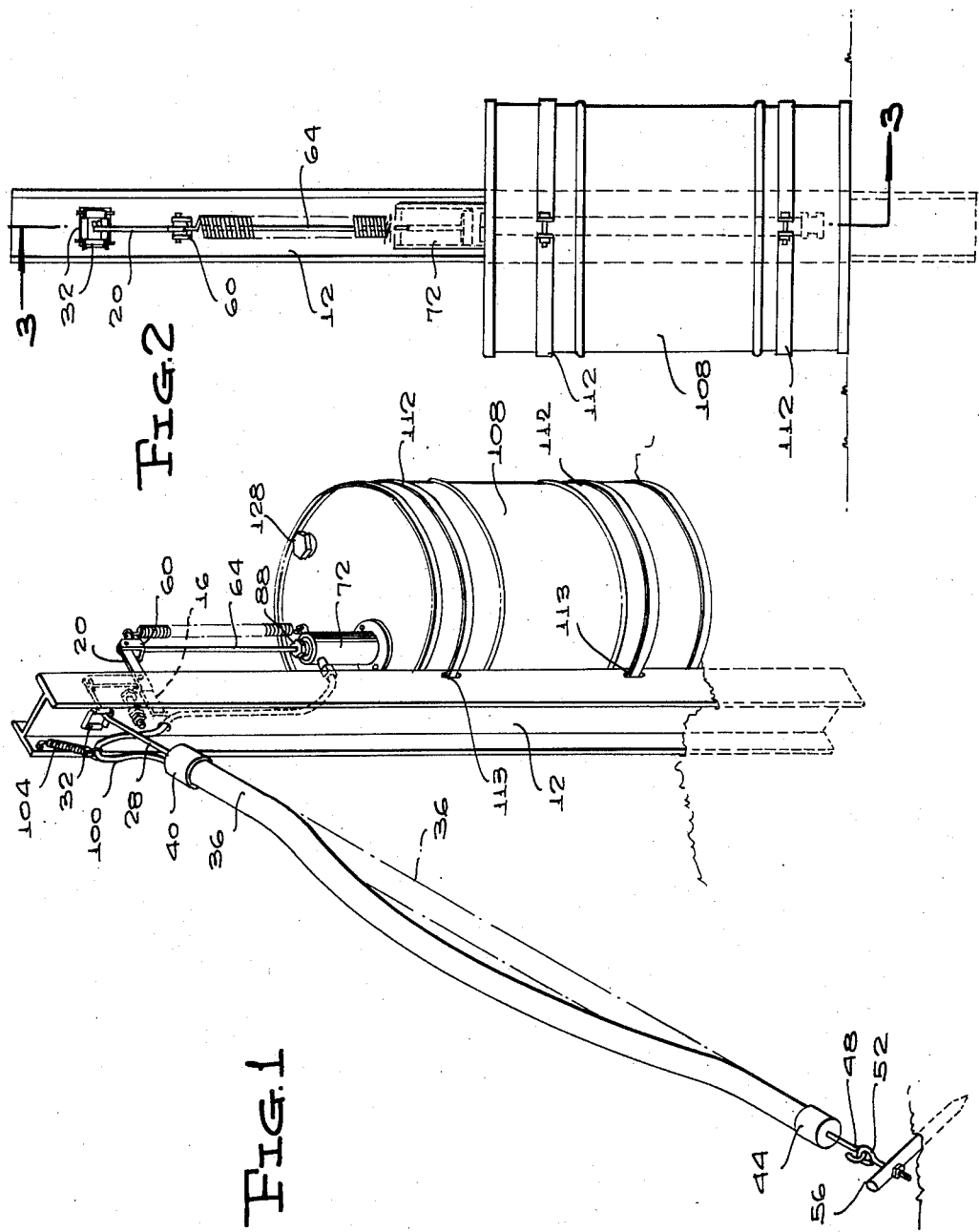
INVENTOR.
DANIEL E. MERWIN
BY
McMorrow, Berman + Davidson
ATTORNEYS June 30, 1959   D. E. MERWIN   2,892,448
ANIMAL-ACTUATED LIQUID APPLICATOR FOR LIVESTOCK
Filed Jan. 31, 1958   2 Sheets-Sheet 2

INVENTOR.
DANIEL E. MERWIN
BY
McMorrow, Berman & Davidson
ATTORNEYS

United States Patent Office 2,892,448
Patented June 30, 1959

2,892,448

ANIMAL-ACTUATED LIQUID APPLICATOR FOR LIVESTOCK

Daniel E. Merwin, Hettinger, N. Dak.

Application January 31, 1958, Serial No. 712,514

4 Claims. (Cl. 119—157)

This invention relates to devices for applying liquids to the hides of cattle and other stock. Such liquids may comprise skin oils, lotions, insecticides and various medicaments.

Devices for the general purposes indicated above are, of course, well known, and are commonly called "scratchers." In such devices, there is generally provided an elongated, flexible, liquid-absorbent member, disposed in position for rubbing of the livestock thereagainst. The resulting movements imparted to said elongated element tend to actuate devices for feeding a quantity of the liquid to said element, with said liquid being absorbed in the element in a manner such that the liquid will be transmitted from the element to the skin of the stock.

Devices for the purpose indicated above are of importance, particularly in instances in which it is necessary to treat the skin of the livestock for the purpose of killing lice. Often, the farmer is required to spray the cattle with a diluted insecticide mixture. This is an operation that tends to affect the cattle or other stock adversely, in many instances. The use of dipped rags, sacks, etc., saturated with the insecticide, is not satisfactory, also. This is due to the fact that these tend to dry out rapidly.

The main object of the present invention is to provide a generally improved applicator for livestock, said applicator being of the type having an animal-actuated pumping action. By reason of the particular construction of the device, movement imparted to the absorbent, elongated, flexible element in any direction, that is, either upwardly, downwardly, or sidewise, will operate the pump to produce flow of the liquid to the absorbent, flexible element.

Another object is to provide a device of the character stated wherein the pumping action will be efficient, and will be caused instantaneously, exen on slight movements imparted to the flexible element.

Another object is to cause the pumping action to take place whether the livestock is rubbing his side, his belly, or his back, against the flexible element.

Another object is to provide a device for applying liquids to the hides of livestock, which will be characterized by the great capacity of the liquid reservoir. This is distinguished from previous devices conceived for the same purpose, the construction of which was such as to usually necessitate a reservoir of small size due to the fact that the reservoir is maintained in an elevated position, at a substantial distance above ground level.

Another object, concomitant to the above, is to facilitate the replenishment of the liquid, by reason of the fact that the reservoir is maintained at ground level, whereby it can be refilled directly from a truck or other vehicle with a minimum of difficulty.

Other objects will appear from the following description, the claims appended thereto, and from the annexed drawing, in which like reference characters designate like parts throughout the several views, and wherein:

Figure 1 is a perspective view of a device according to the present invention, the flexible element being shown in full and dotted lines in different positions to which it may be flexed;

Figure 2 is a rear elevational view of the device;

Figure 4:
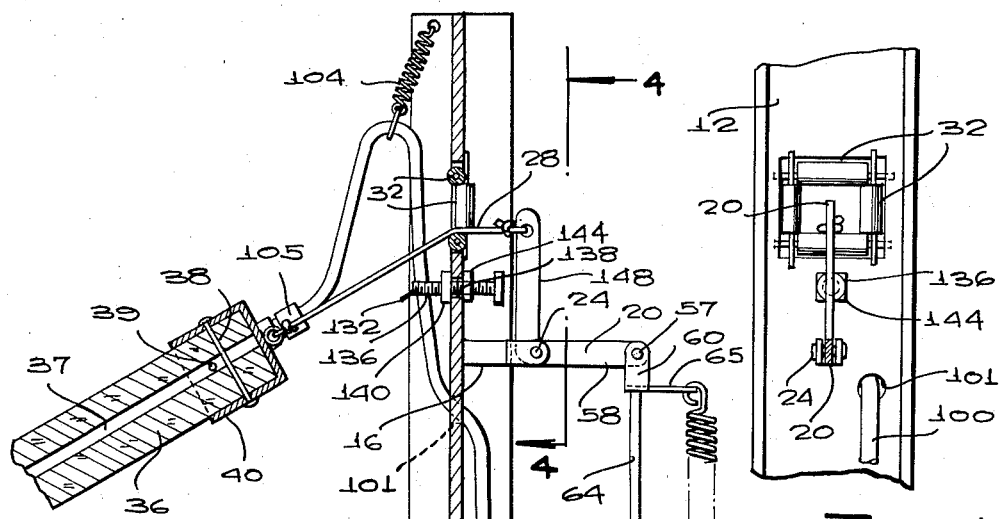
Figure 4 is a detail sectional view, on the same scale as Figure 3, taken on line 4—4 of Figure 3.

Referring to the drawing in detail, a standard 12 of I-beam material is embedded firmly in the ground, and welded or otherwise fixedly secured to the web portion of said standard is a horizontally, laterally projecting bracket 16 having a bifurcated distal end embracing the midlength portion of a bell crank 20 pivoted at 24 upon the bracket 16 to swing in a vertical plane.

Connected to the upper end of the vertical leg of the bell crank 20 is a rope or other flexible element 28, constituting a flexible connector that extends through an opening of the standard 12. A rectangular series of rollers 32 (see Figure 4) is mounted in the opening of the standard, so that there are rollers along each edge of the opening. By reason of this arrangement, the flexible connector 28 will be trained about a roller; regardless of what movements are imparted to the flexible connector by the rubbing of the cattle against the elongated, absorbent, flexible element 36 to which the connector is attached, the connector will still be retained in engagement with one of the rollers 32 to reduce friction.

The connector 28 extends through the standard, and at the end of the connector remote from the bell crank, said connector 28 is attached to the upper end of the inclined, absorbent flexible element or wick 36 previously referred to herein.

The member 36 is connected, by a cross pin 38, to a cup-shaped metal cap 40 at the upper end of the member 36, with the flexible connector 28 being attached to said cap. At the lower end of the member 36 there is provided a similar cap 44, from which extends the shank of an eye 48 connected to an eyebolt 52 attached to a stake 56 spaced from the standard 12.

The element 36 has an end to end bore 37, and in communication with said bore at one end is a small passage 39, the purpose of which will be presently made apparent.

Element 36 is formed of any suitable absorbent, flexible material, such as heavy felt, packing, wicking, etc. The device thus functions as a wick, so that when the liquid is fed into the bore of the member, said liquid is caused to flow outwardly through the wall of the member and be applied to the hide of the animal rubbing thereagainst.

Figure 3:
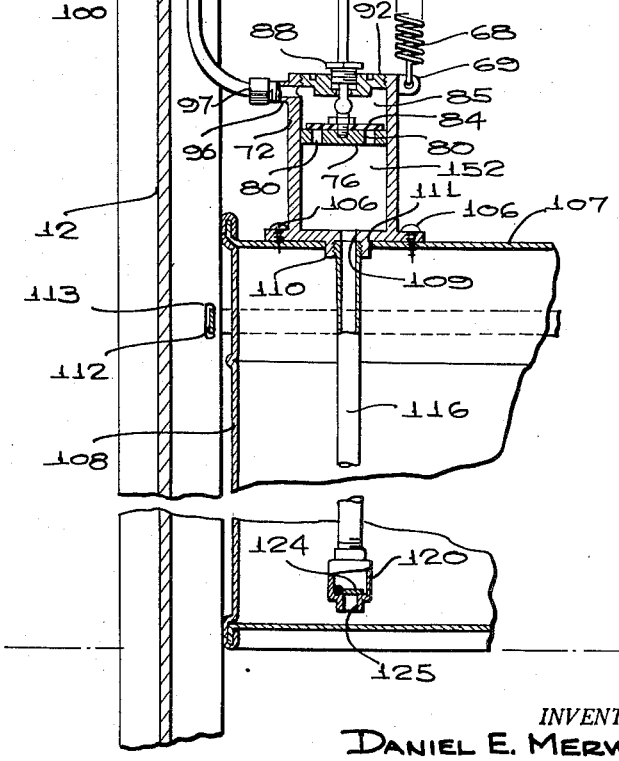
Figure 3 is an enlarged sectional view taken vertically through the device, substantially on line 3—3 of Figure 2, portions being broken away.

Referring to Figure 3, pivotally connected at 57 to the outer end of the horizontal leg 58 of bell crank 20 is a yoke 60, to which is fixedly secured the upper end of a sucker rod 64. Rigid with and projecting forwardly from the yoke is an ear 65 to which is hooked one end of a contractile spring 68, the other end of which is hooked to an ear 69 fixed to and projecting outwardly from the upper end of a pump cylinder 72. Working in the pump cylinder is a piston 76, connected to the inner end of the rod 64 and having openings 80 normally closed by a flexible portion 84 that constitutes a check valve on the piston.

It will be apparent that when the rod 64 is lowered, the check valve means 84 will open, so that fluid confined within the cylinder 72 below the piston will be forced upwardly through openings 80 into the outlet chamber 85 of the pumping cylinder. A packing assembly 88 is provided in the removable end wall 92 of the cylinder, with rod 64 slidably, sealably engaging in the packing assembly.

In the upper portion of the cylinder side wall, there is provided an outlet 96 to which is connected, by a fitting 97, a hose 100 extending through an opening 101 (Figure 4) of the standard 12. Hose 100 is suspended from the standard by means of a contractile spring 104. The hose, at its outlet, is connected by a fitting 105 to the cap 40 of the elongated flexible element 36, in communication with passage 39.

The pump cylinder is fixedly mounted, by screws 106 or equivalent means, upon the top wall 107 of a large capacity drum 108 in which is held the liquid to be applied to the stock. In the bottom wall of the pump cylinder there is an inlet opening 109, and extending about said opening is a depending, internally threaded boss 110 of the bottom wall of the pump cylinder, said boss extending downwardly through an opening 111 formed in the top wall 107.

The drum is securely engaged, in a position supported upon the ground G, against standard 12, through the provision of a plurality of connecting bands 112 extending about the drum and passing through slot-like openings 113 of standard 12.

An inlet tube 116 of the pump is externally threaded at its upper end, for engagement in the boss 110. Tube 116 extends downwardly within drum or reservoir 108, and at its lower end, is threadedly connected to a cylindrical valve housing 120, in which is mounted a check valve 124 controlling flow of liquid into the housing through an inlet 125.

As will be apparent, the drum can be readily filled through a filler opening provided in the top wall 107, said filler opening being normally closed by a filler plug 128 (Figure 1).

Limiting swinging movement of the bell crank in a counterclockwise direction in Figure 3 is a stop means generally designated 132, including a screw 136 extending through an opening 138 of the web portion of standard 12. Nuts 140, 144 are threadedly engaged with the shank of the screw, bearing against opposite faces of the standard. The head of the screw is so disposed as to engage the vertical leg 148 of the bell crank in the event the bell crank should swing counterclockwise in Figure 3, under pull resulting from flexure of the element 36 by the cattle, to an excessive extent.

In use of the device, as previously mentioned the drum can be readily filled with minimum difficulty with a large quantity of the liquid. Refilling of the drum is accomplished without disturbance of the drum or of the remaining components of the apparatus in any way. In any event, when the cattle rub against the element 36, they will flex the element either upwardly, downwardly, or laterally in either direction, and of course, the element is so disposed as to permit the cattle to scratch any portion of their hides thereagainst, to assure maximum distribution of the liquid.

Flexure of the element 36 in this way will exert a pull upon the connector 28, tending to shift the connector to the left in Figure 3. This will be so regardless of the direction in which the element 36 is flexed.

The pull of the connector will rock the bell crank 20 counterclockwise in Figure 3, moving the pump rod upwardly. Piston 76, moving upwardly within cylinder 72, will force any liquid disposed above the piston in chamber 85 upwardly through hose 100, so as to cause the liquid to be distributed through the element 56 and thus be transferred to the hide of the cattle or other stock.

Upward movement of piston 76 also creates suction at the intake end of the pump cylinder, so that valve 124 opens to permit liquid to rise within tube 116 into the intake chamber 152 of the piston cylinder.

Downward movement of the pump rod results, of course, as soon as the upward pull thereon ceases, by reason of the continuing tendency of spring 68 to contract. On downward movement of the piston 76, any liquid trapped within the chamber 152 will be forced upwardly through openings 80 with the flexible valve disc 84 rising to permit the passage of said liquid into the outlet chamber 85 of the cylinder. The mentioned trapping of liquid in chamber 162 will result, of course, by reason of the fact that the check valve 124 prevents return flow of fluid from the tube 116 into the reservoir. Subsequently, on the next flexure of the element 36, the liquid which has been forced into the chamber 85 will be forced upwardly into the hose 100.

In this way, there is a repeated saturation of the element 36 with liquid, resulting from every flexure of the element by the animal.

The invention has the further desirable characteristic of permitting adjustment in respect to the flow. This regulation of the flow is produced by adjustable positioning of the stop screw 136. Said adjustable positioning will control the extent of rocking movement of the bell crank in a counterclockwise direction, which of course in turn controls the length of the stroke of the pump rod 64. One can therefore increase the flow for a lice treatment, which may be needed at particular seasons of the year, and thereafter reduce the flow to control flies or other insects.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. An animal-actuated device for applying a liquid to the hide of an animal, comprising: a standard; a reservoir abutting the same; a pump mounted on the reservoir and including a pump cylinder having an inlet communicating with the reservoir, said cylinder having an outlet, and a sucker rod working in and extending upwardly from said cylinder; a wick declining in a direction away from the standard, said wick having a lower end anchored to the ground and having an upper end terminating adjacent the standard; a bell crank rockably mounted upon the standard and having a pivotal connection at one end to the upper end of the sucker rod, whereby to shift the sucker rod in one direction responsive to rocking of the bell crank in one direction; a flexible connection between the other end of the bell crank and said upper end of the wick, said wick being of elongated, flexible formation and exerting pull on the flexible element effective to rock the bell crank in said one direction responsive to flexure of the wick in any direction by an animal; resiliently yielding, contractile means connected between the pump cylinder and said sucker rod, tending to shift the sucker rod in an opposite direction; and a conduit connected between the pump outlet and the wick.

2. An animal-actuated device for applying a liquid to an animal's hide, comprising: a vertically extending standard having an opening adjacent its upper end; a reservoir abutting said standard spaced downwardly from the opening; a vertically extending pump cylinder mounted upon the reservoir; a piston reciprocating vertically in the cylinder and separating the same into a lower, intake chamber and an upper, outlet chamber, said cylinder having at its lower end an inlet providing communication between the intake chamber and the reservoir and check-valved for flow from the reservoir into the intake chamber; a rigidly formed, vertically reciprocable sucker rod secured to the piston, the piston having an opening check-valved for flow from the intake into the outlet chamber; a bell crank pivoted on the standard having a pivotal connection at one end to the sucker rod for shifting the sucker rod vertically upwardly on rocking of the bell crank in one direction; means connected between the bell crank and cylinder for resiliently, yieldably biasing the sucker rod in a downward direction; a flexible element connected to the other end of the bell crank and extending through said opening of the standard; a wick connected at one end to the flexible element and adapted at its other end to be anchored to the ground, to produce movement of the wick responsive to rubbing of an animal thereagainst, thereby to rock the bell crank in said one direction thereof; and a flexible outlet tube connected between the outlet chamber and the wick, for directing into the wick liquid forced out of the outlet chamber in response to reciprocation of the sucker rod.

3. An animal-actuated device for applying a liquid to an animal's hide, comprising: a vertically extending standard having a transverse opening adjacent its upper end; a reservoir abutting said standard spaced downwardly from the opening; a vertically extending pump cylinder mounted upon the reservoir; a piston reciprocating vertically in the cylinder and separating the same into a lower, intake chamber and an upper, outlet chamber, said cylinder having at its lower end an inlet providing communication between the intake chamber and the reservoir and check-valved for flow from the reservoir into the intake chamber; a rigidly formed sucker rod mounted in the cylinder for vertical reciprocation and secured to the piston, the piston having an opening check-valved for flow from the intake into the outlet chamber; a right angular lever pivoted on the standard for movement about a horizontal axis and having one leg extending in a generally horizontal direction and its other leg extending in a generally vertical direction, said one leg being connected to the sucker rod for shifting the sucker rod vertically upwardly on rocking of the lever in one direction; means connected between the lever and cylinder for resiliently, yieldably biasing the sucker rod in a downward direction; a flexible element connected to the other leg of the lever and slidably engaged in said opening of the standard; a wick connected at one end to the flexible element and adapted at its other end to be anchored to the ground, to produce movement of the wick responsive to rubbing of an animal thereagainst, thereby to rock the lever in said one direction thereof; and a flexible outlet tube suspended intermediate its ends from the standard and connected between the outlet chamber and the wick, for directing into the wick liquid forced out of the outlet chamber in response to reciprocation of the sucker rod.

4. An animal-actuated device for applying a liquid to an animal's hide, comprising: a vertically extending standard having a transverse opening adjacent its upper end; a reservoir mounted stationarily abutting said standard and spaced downwardly from said opening; a vertically extending pump cylinder fixedly mounted upon and projecting upwardly from the reservoir; a piston reciprocating vertically in the cylinder and separating the same into a lower, intake chamber and an upper, outlet chamber, said cylinder having at its lower end an inlet providing communication between the intake chamber and the reservoir, said inlet being check-valved for flow from the reservoir into the intake chamber; a rigidly formed sucker rod mounted in the cylinder for vertical reciprocation and secured to the piston, the piston having an opening check-valved for flow from the intake into the outlet chamber; a right-angular lever pivoted on the standard for movement about a horizontal axis and having one leg extending in a generally horizontal direction and its other leg extending in a generally vertical direction, said one leg being connected to the sucker rod for shifting the sucker rod vertically upwardly on rocking of the lever in one direction; means connected between the lever and cylinder for resiliently, yieldably biasing the sucker rod in a downward direction; a flexible element slidably engaged intermediate its ends in said opening of the standard, said flexible element being connected at one end to and extending generally horizontally from the other leg of the lever to said opening of the standard, the flexible element declining in a direction from said opening toward its other end; a wick connected at one end to said other end of the flexible element and adapted at its other end to be anchored to the ground, to produce movement of the wick responsive to rubbing of an animal thereagainst, thereby to rock the lever in said one direction thereof; stop means adjustably mounted on the standard adjacent the lever and arranged to limit the rocking of the lever in said one direction thereof, said stop means being adjustable toward and away from the lever within the path of rocking movement of the lever; and a flexible outlet tube suspended intermediate its ends from the standard and connected between the outlet chamber and the wick, for directing into the wick liquid forced out of the outlet chamber in response to reciprocating of the sucker rod.

References Cited in the file of this patent

UNITED STATES PATENTS

| | | |
|---|---|---|
| 2,765,775 | Kramer | Oct. 9, 1956 |
| 2,766,726 | Duff | Oct. 16, 1956 |
| 2,785,653 | Caldwell | Mar. 19, 1957 |
| 2,813,510 | Piel | Nov. 19, 1957 |